United States Patent
Ljunggren

(10) Patent No.: US 6,677,731 B2
(45) Date of Patent: Jan. 13, 2004

(54) METHOD AND A DEVICE FOR CHARGING A BATTERY

(75) Inventor: Benny Ljunggren, Västerås (SE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 10/204,708

(22) PCT Filed: Feb. 16, 2001

(86) PCT No.: PCT/SE01/00337

§ 371 (c)(1), (2), (4) Date: Nov. 20, 2002

(87) PCT Pub. No.: WO01/65658

PCT Pub. Date: Sep. 7, 2001

(65) Prior Publication Data

US 2003/0141852 A1 Jul. 31, 2003

(30) Foreign Application Priority Data

Feb. 28, 2000 (SE) .......................................... 0000641-1

(51) Int. Cl.⁷ .............................................. H01M 10/44
(52) U.S. Cl. ...................................................... 320/152
(58) Field of Search ................................ 320/127, 128, 320/137, 152, 157, 159, 160, 162, 164

(56) References Cited

U.S. PATENT DOCUMENTS 4,031,451 A * 6/1977 Gordon 5,623,197 A * 4/1997 Roseman et al.

FOREIGN PATENT DOCUMENTS

GB  210089  *  8/1997

* cited by examiner

*Primary Examiner*—Edward H. Tso
(74) *Attorney, Agent, or Firm*—Howrey Simon Arnold & White

(57) ABSTRACT

A device for charging a battery comprises an alternating current source, a rectifier being connected with its input to the alternating current source and being connected with its output to the battery for charging thereof. It also has a member for measuring the charging current from the rectifier to the battery and a means (13) for comparing the measured charging current with a current limit value and an arrangement adapted to control the voltage on the output of the rectifier based on information about said comparison and decrease it if the measured current exceeds the current limit value for reduction of the charging current. A unit (23, 28, 30) is adapted to form the current limit value by comparing a current value formed by the value of said measured charging current with a restriction on its positive rise speed with a predetermined maximum current limit value, and to determine the lowest of the so obtained current value and said maximum current limit value as said current limit value for the comparison of said means (13).

20 Claims, 3 Drawing Sheets

METHOD AND A DEVICE FOR CHARGING A BATTERY

FIELD OF THE INVENTION AND PRIOR ART

The present invention is related to a method and device for charging a battery and, more particularly, to a method and device for dynamically varying a current limit value for battery charging current.

First of all, it is pointed out that "the alternating current source" herein is to be given a very broad sense and may for instance be an alternating current net, but also be formed by converting electric energy from a direct current supplying arrangement, such as a direct voltage net, into an alternating voltage, so that the "alternating current source" is used as a summary for all types of configurations, which are adapted to supply an alternating current on the input of said rectifier.

A device of this kind may be used for charging all kinds of batteries, but to clearly illustrate the problems the invention tries to solve, such a device for charging a battery onboard a railway vehicle for electrified railway traffic will be explained hereinafter, but thus not at all for the purpose of limiting the invention. Such a battery onboard a railway vehicle is in most cases used especially to give an extra energy addition when starting the vehicle, but also to feed for example computers and lighting equipment in the vehicle. The alternating current consumer, which is fed in parallel with the battery, may be for instance fans, main compressors, lighting equipment etc in the vehicle or cars connected thereto. The electric energy is normally obtained by the vehicle taking, from a contact line 1 (see FIG. 1), electric energy, for instance in the form of an alternating voltage, which in Sweden normally is a single phase alternating voltage with a frequency of 16⅔ Hz, and that this via a rectifier not shown is converted into a direct voltage, of for instance about 750 V, which is then brought to a converter in the form of an inverter 2, where it is converted into an alternating voltage. The level of this alternating voltage is then changed by a transformer 3, from which the alternating voltage is fed further to consumers 4 of the kind mentioned. At the same time, a part of the alternating voltage is taken into a converter in the form of a rectifier 5, which rectifies the voltage and, at a higher voltage on its output 6 than the voltage of a battery 7, sends a charging current thereto for charging thereof. Said converters are preferably formed by current valves connected in series, each having at least one switch in the form of a semiconductor element and a rectifying diode connected in anti-parallel therewith controlled in a conventional manner according to a pulse width modulation pattern as in the embodiment shown in FIG. 2 or as non-controlled rectifiers, e.g. diode rectifiers, as in the embodiment according to FIG. 1.

From the contact line 1, the engine of the vehicle obtains electric energy also in parallel with the shown device, preferably by a not shown converter.

The charging current to the battery can be measured by schematically indicated members 8, whereas the voltage of the battery can be measured by members 9. The measurement values obtained in this manner are used for controlling the output voltage of the rectifier 5 and thereby the charging current to the battery 7. When the output voltage on the output 6 exceeds the voltage of the battery, the battery will be charged by the coil 10. The device also has an arrangement 11 adapted to control the voltage on the output of the rectifier based on information about a comparison of the measured charging current with a current limit value and decrease it if the measured current exceeds the current limit value for reduction of the charging current. This takes place at a device of the kind shown in FIG. 1 by controlling the inverter 2 so that a suitable voltage level is obtained on its output. However, this has the disadvantage that when the voltage to the rectifier 5 has to be decreased, the level of the voltage to the consumers 4 will then be reduced automatically.

FIG. 2 shows a variant of the device according to FIG. 1, at which said arrangement 11 controls the rectifier instead, so that the feed to the battery and that to the consumers practically become independent of each other.

In FIG. 3 it is shown somewhat more in detail how the arrangement 11 of a device of this kind may function. The value of the measured charging current arrives at 12 and its negative value is added in an addition member 13 to a current limit value arriving at 14. If the addition in 13, which in practice is a comparison of the charging current with a current limit value, which the charging current should not exceed to prevent triggering of overcurrent protection and stopping the operation of the entire device according to FIGS. 1 and 2 with interruption of the feed of electric energy to said consumers 4 as well as to the battery as a result, gives a negative value on the input 15 to a member 16, a reference voltage value for the voltage on the output 6 of the rectifier is output on the output of said member, and is then made lower than a predetermined voltage value input to the member 16 at 17. However, should the value of the charging current be lower than said current limit value, then the reference voltage input at 17 would also be output at 18. At 19, the battery voltage multiplied by −1 is input to an addition member 20, which inputs the result of the addition to a member 21, which at a lower reference voltage than battery voltage sends signals to a control unit 22, which in the device according to FIG. 1 controls the inverter 2 as concerns voltage peak value and in the device according to FIG. 2 controls the rectifier 5 as concerns voltage peak value. If the battery voltage is higher than the reference voltage at 18, said voltage peak value and thereby the voltage out of the rectifier and thereby finally the charging current to the battery are reduced.

In FIG. 4 it is schematically shown what could happen if the level of the voltage into the rectifier suddenly decreases, for instance due to a large power output from a consumer when starting the same. It is schematically illustrated how the output voltage $U_6$ varies over time, $U_B$ being the battery voltage. Furthermore, the charging current $I_B$ is drawn and said current limit value $I_B$,lim is drawn with a broken line over time. It is apparent that when the output voltage from the rectifier decreases below the battery voltage, the charging current is lowered to 0, but when said output voltage then rises again above the battery voltage, the result due to the low internal resistance in the battery will be a very steep rise of the charging current, which often leads to a very large overshoot of the charging current. This implies that the charging current passes the current limit value and the arrangement 11 performs a control in the manner shown in FIG. 3 to lower the charging current below this value. However, the current overshoot is at times so large that over-current protection manages to trigger to prevent damages to transformers and diodes, so that the entire device is shut off with significant problems as a result. It is pointed out that voltage drops with corresponding problems as a result also can arise on the load side of the battery, where also large loads may occur.

SUMMARY OF THE INVENTION

The object of the present invention is to provide a device and a method of the initially defined kind, which find a remedy for the above mentioned problems with risk for triggering over-current protection upon suddenly rising output voltage from the rectifier. This object is obtained according to the invention by providing such a device with a unit adapted to form said current limit value by comparing a current value formed by the value of said measured charging current with a restriction on its positive rise speed with a predetermined maximum current limit value, and to determine the lowest of the so obtained current value and said maximum current limit value as said current limit value for the comparison of said means.

By dynamically varying the current limit value in this manner already when the charging current starts to rise, even if the current intensity then lies far below the value, which can really be accepted, the charging current will pass said current limit value if it rises faster than said positive rise speed and thereby the arrangement will control the voltage on the output of the rectifier to decrease for reduction of the charging current, so that the current intensity required for the over-current protection to be triggered is never reached. Accordingly, the invention is not based on that the regulation of the charging current is done faster, but it is started earlier instead, i.e. far below the maximally allowed level on the current. This way of regulation implies a very smooth way of restricting transients.

According to a preferred embodiment of the invention said unit comprises members adapted to add a maximum current value addition/unit of time to the value of the measured charging current and members adapted to compare a so formed current value with existing charging current and determine the lowest of them as a theoretical charging current value and send this to said adding members so as there to be considered as a new charging current value, and that the comparing member is adapted to send said theoretical charging current values to a member for comparing that with said maximum current limit value to determine the lowest of these as current limit value for the comparison of said means. Hereby it is ensured that the current limit value for the comparison of said means, which is the basis for the actual control of the output voltage from the rectifier, on one hand never gets higher than the value of the sum of the charging current and the maximum current value addition, which preferably at normal charging current implies that this sum becomes considerably lower than the maximally allowed current limit value, and on the other hand that the current limit value cannot rise too quickly. In practice, this implies that the current limit value will be exceeded by the charging current directly when it starts to rise faster than the positive rise speed allowed by said restriction, and this irrespective of the level of the charging current at that time, so that the regulation of the output voltage downwards can be started already at very low, but quickly rising charging currents.

According to another preferred embodiment of the invention the device is adapted to be a part of the electric system of a railway vehicle, and the alternating current source is adapted to obtain electric energy from a contact line for said railway vehicle. This contact line could be a direct current line as well as an alternating current line. The device is especially well suited for this application, as the problem which the invention tries to solve often appears in the electric system of such railway vehicles provided with devices for charging batteries.

The invention is also related to a method for charging a battery according to the appended method claims. The advantages with such a method are clearly apparent from the discussion above concerning the device according to the invention.

Further advantages with and advantageous features of the invention are apparent from the following description and the other dependent claims.

BRIEF DESCRIPTION OF THE DRAWINGS

Below follows a description of the device according to a preferred embodiment of the invention with reference to appended drawings, in which.

DETAILED DESCRIPTION OF A PREFERRED EMBODIMENT OF THE INVENTION

Figure 5:
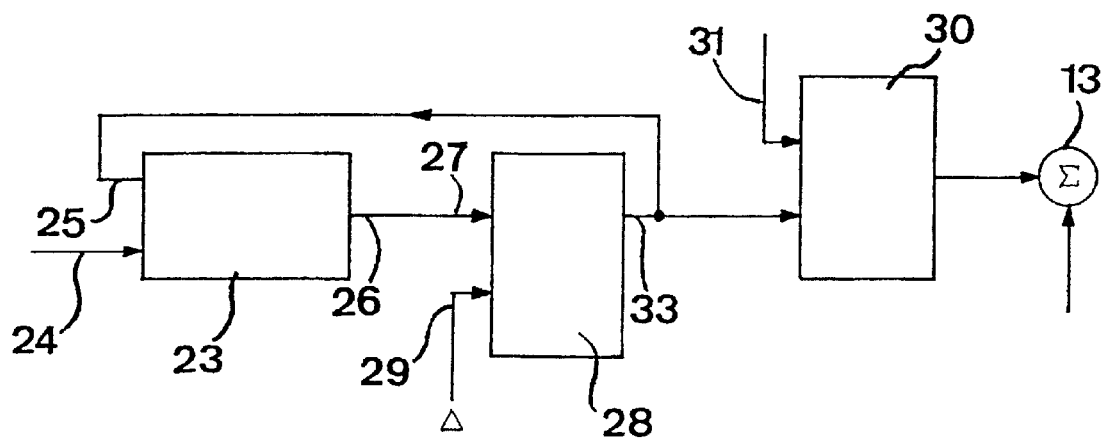
FIG. 5 is a view of a part of a device according to a preferred embodiment of the invention.

Actually, it can be considered as if two preferred embodiments of the invention are described hereinafter, as the part of the device according to the invention, which is shown in FIG. 5 can be considered to be part of a device according to FIG. 1 as well as FIG. 2 as a part of the arrangement 11 shown there for direct or indirect control of the voltage on the output of the rectifier.

Figure 1:
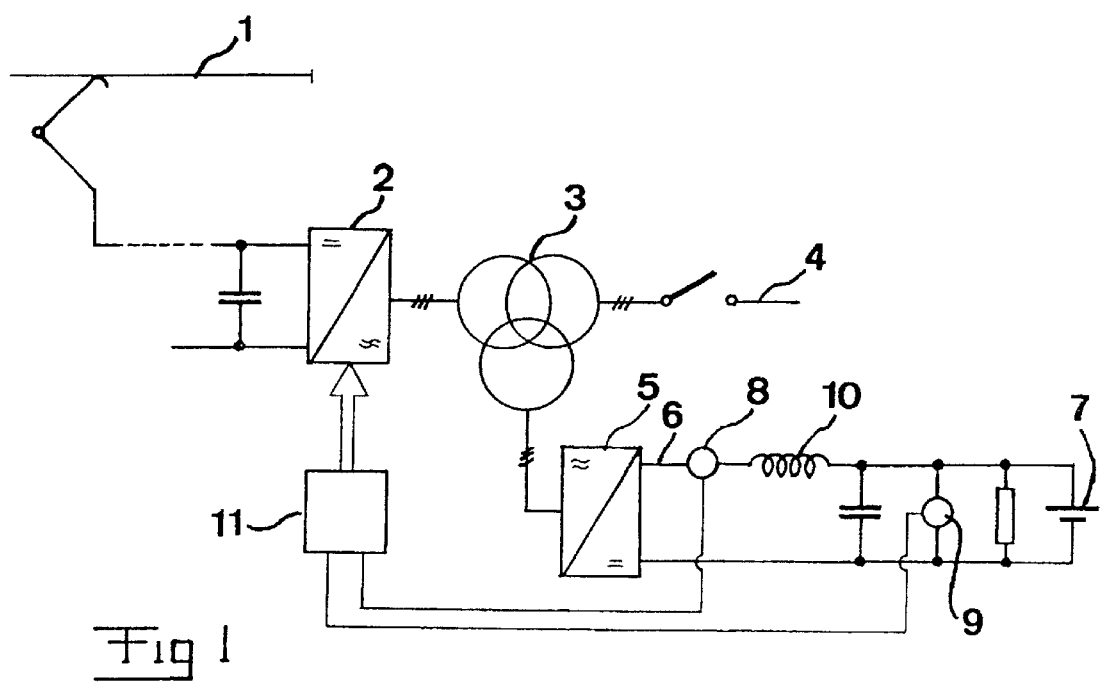
FIG. 1 is a schematical view illustrating a device for charging a battery according to a first type, on which the invention may be applied.
Figure 2:
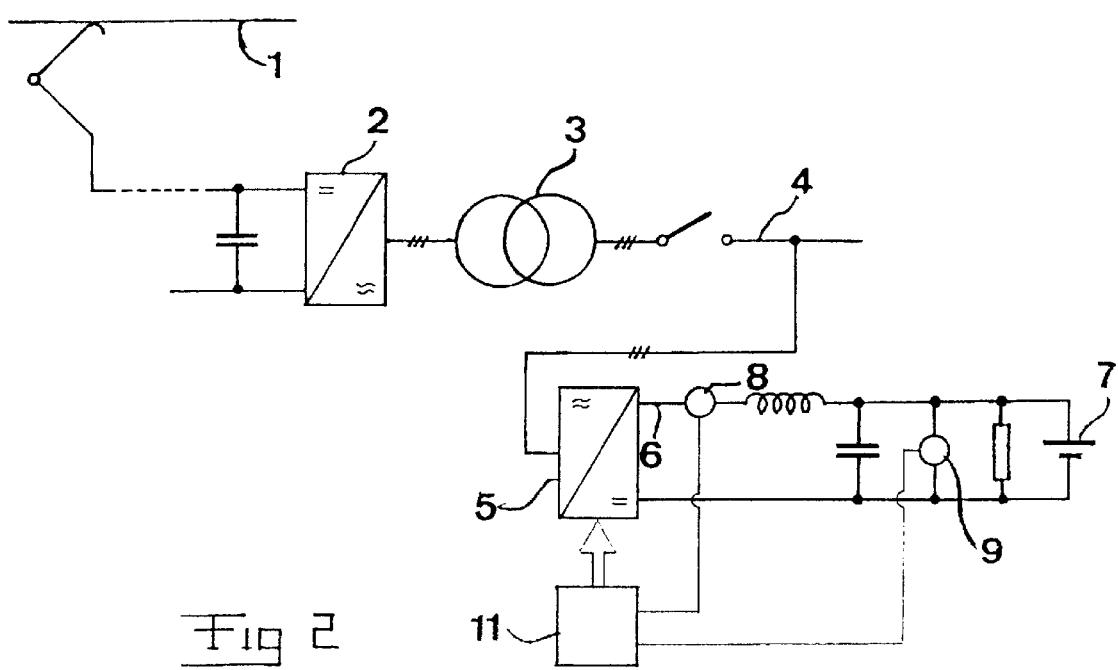
FIG. 2 is a schematical view illustrating a device for charging a battery according to a second type, on which the invention may be applied.
Figure 3:
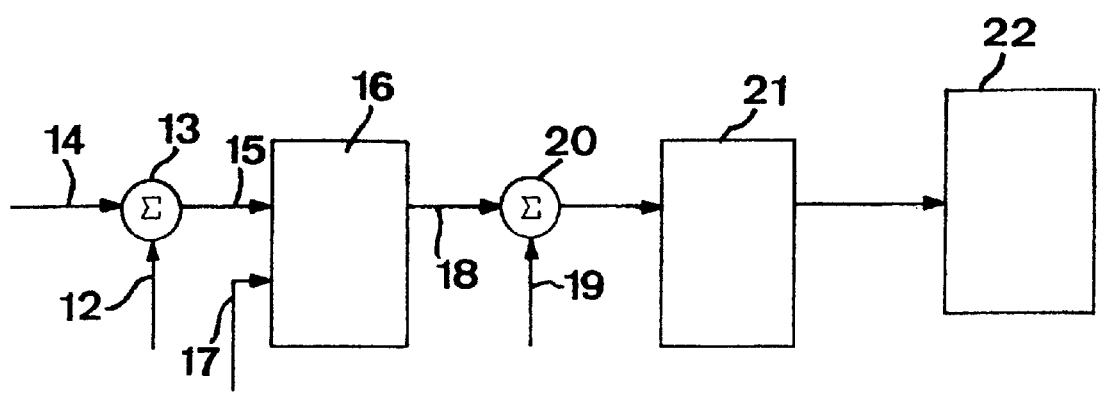
FIG. 3 illustrates more in detail a part of the device according to prior art.

This arrangement first of all comprises a member 23, upstream of the means 13 in FIG. 3, adapted to, on its input 24, receive a value of the charging current to the battery 7 delivered from a member 8 (see FIGS. 1 and 2). This member 23 is adapted to make a comparison of this value with a value arrived at a second input 25 and send the lowest of these values further on its output 26 to an input 27 of a member 28, which adds to this value a predetermined addition Δ input on another input 29. Only a certain addition per unit of time can be added to the value arriving at 27. Δ is substantially smaller than, preferably smaller than 20% of the normal difference between $I_B$ and the maximally allowed current limit value. The so obtained value is sent back to the input 25 of the member 23 to be compared with the charging current. Since the lowest of the charging current value and the value on the input 25 is continuously sent further to the member 28 which gives a certain addition per unit of time thereto, the value on the output 33 of the member 28 cannot increase faster than with this addition per unit of time. Simplified, it could be expressed as if $I_B$+Δ arrives at 27 and a certain time has not passed since making the last addition of Δ, no addition at all takes place in 28. This value is then sent further to a member 30, where it is compared with a maximum current limit value obtained on an input 31 and the lowest of these two values is sent further to the means 13 illustrated in FIG. 3, which works in the same way as described with reference to FIG. 3. After the means 13 the other members 16, 20, 21 and 22 shown in FIG. 3 follow, having the same function as previously described.

Figure 6:
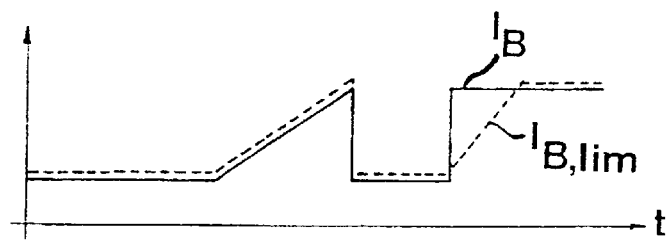
FIG. 6 is a diagram illustrating how a current limit value $I_B$,lim obtained by the device according to FIG. 5 changes over time t and depending on the charging current $I_B$.

In FIG. 6 it is illustrated how the value $I_B,\text{lim}$ on the output 33 from the member 28 will vary over time upon changes of the value of the charging current obtained on the input 24 of the member 23. Thus, the result of the members 23 and 28 with the interconnection thereof is shown. It is apparent that $I_B,\text{lim}$ will always be $\Delta$ larger than $I_B$ as long as the value of the charging current does not rise too steeply, i.e. faster than the addition $\Delta$ per unit of time. Similarly, the fall speed of $I_B,\text{lim}$ is not restricted. When contrary thereto the value of the charging current rises faster than the rise speed corresponding to the maximum addition $\Delta$ per unit of time in the member 28, the value of the charging current will exceed $I_B,\text{lim}$ and thereby a negative value will be achieved in 13 and the output voltage from the rectifier will be regulated downwards. However, this is of course always made when the charging current exceeds the maximum current limit value delivered on the input 31 at the latest.

Figure 4:
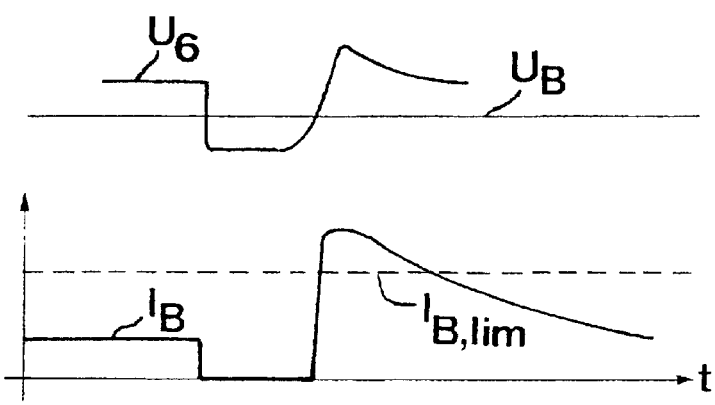
FIG. 4 is a diagram over the output voltage $U_6$ from the rectifier, the battery voltage $U_B$ and the charging current $I_B$ over time t for the previously known device according to FIG. 3.
Figure 7:
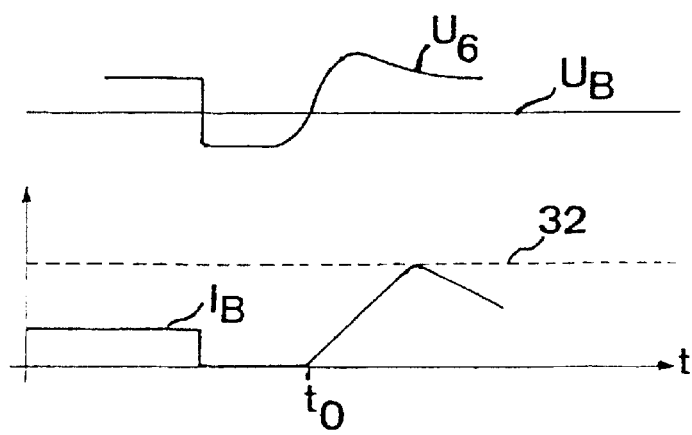
FIG. 7 is a diagram corresponding to FIG. 4 for the device according to the invention according to FIG. 5.

In FIG. 7 it is shown what will happen to the current $I_B$ in practice when the output voltage $U_6$ from the rectifier varies in the way previously illustrated in FIG. 4 for the previously known device in case of a device according to the invention according to FIG. 5. It is apparent that the quick rise of $I_B$, which normally would have followed as of the time $t_0$, will not take place, as the charging current directly will rise more quickly than the quickest possible rise of the dynamic limit value delivered by the member 28 and thereby a regulation of the voltage $U_6$ downwards will start. Therefore, the value of the charging current does not reach up to the maximum current limit value indicated by the broken line 32 and no over-current protection has to be triggered.

The invention is of course not in any way restricted to the preferred embodiment described above, but many possibilities to modifications thereof will be apparent to a person with ordinary skill in the art without departing from the scope of the invention, such as this is defined by the appended claims.

Other variants than the one shown above for obtaining a dynamic current limit value with restricted rise speed are conceivable, and all of these functions could of course be comprised in one single unit, and the same holds for the entire arrangement mentioned above including the function of calculating a dynamic current limit value, which could be formed by a computer unit programmed in a suitable manner. The invention is not restricted to the described, time discrete implementation, but also implementation continuous in time, for instance with analogue technology, would be conceivable.

It is also within the scope of the invention to design the restriction of the rise speed of the current limit value in such a manner that this is dependent on some parameter, for instance the size of the charging current, if this should be desired for some particular application. For instance, a higher rise speed of the charging current could then be allowed within some value range thereof than within any other without the regulation of the output voltage from the rectifier interfering.

What is claimed is:

1. A method for charging a battery via a rectifier being connected with its input to an alternating current source adapted to provide at least one consumer other than the battery with electric energy and being connected with its output to the battery, the method comprising:

measuring charging current from the rectifier to the battery;

comparing the measured charging current with a current limit value; and controlling the output voltage from the rectifier to reduce the charging current to the battery if the measured charging current exceeds the current limit value, wherein the current limit value is determined by comparing a predetermined maximum current limit value with a theoretical current value derived from the measured charging current with a restriction on its positive rise speed, and selecting the lowest of the predetermined maximum current limit value and the theoretical current value as the current limit value for the comparison with the measured charging current.

2. The method according to claim 1, wherein deriving the theoretical current value further comprises:

comparing a previous theoretical charging current value with the measured charging current;

selecting the lowest of the previous theoretical charging current value and the measured charging current as an intermediate value;

adding a maximum current value addition per unit of time to the intermediate value to derive the theoretical charging current value.

3. The method according to claim 1, wherein electric energy is fed to the alternating current source via a contact line for railway vehicles.

4. The method according to claim 1, wherein a direct voltage is converted into an alternating voltage in an inverter for feeding to the input of the rectifier.

5. The method according to claim 4, wherein the output voltage on the output of the rectifier is controlled by controlling the inverter.

6. The method according to claim 1, wherein the output voltage on the output of the rectifier is controlled by controlling the rectifier.

7. A device for charging a battery comprising:

an alternating current source;

a rectifier connected with its input to the alternating current source and being connected with its output to the battery for charging thereof, the alternating current source being adapted to feed at least one consumer other than the battery with electric energy;

a member for measuring the charging current from the rectifier to the battery;

a means for comparing the measured charging current with a current limit value; and an arrangement adapted to control the voltage on the output of the rectifier based on information about said comparison and decrease it if the measured current exceeds the current limit value for reduction of the charging current, the arrangement comprising a unit adapted to generate the current limit value by comparing a predetermined maximum current limit value with a theoretical current value derived by applying a restriction on positive rise speed to the measured charging current, to determine the lowest of the predetermined maximum current limit value and the theoretical current value.

an arrangement adapted to control the voltage on the output of the rectifier based on information about said comparison and decrease it if the measured current exceeds the current limit value for reduction of the charging current, the arrangement comprising a unit adapted to generate the current limit value by comparing a predetermined maximum current limit value with a theoretical current value derived from the measured charging current with a restriction on its positive rise speed to determine the lowest of the predetermined maximum current limit value and the theoretical current value.

8. The device according to claim 7, wherein the unit comprises:

means for comparing a previous theoretical charging current value with the measured charging current and selecting the lowest of them as an intermediate value; and means for adding a maximum current value addition per unit of time to the intermediate value to derive the theoretical charging current value.

9. The device according to claim 7, wherein the device is adapted to be a part of the electric system of a railway vehicle, and the alternating current source is adapted to obtain electric energy from a contact line for the railway vehicle.

10. The device according to claim 9, wherein the battery is adapted to be used for supplying electric energy to an engine of the vehicle when starting the vehicle.

11. The device according to claim 9, wherein the consumer comprises equipment included in the vehicle selected from the group consisting of fans, main compressors, and lighting equipment.

12. The device according to claim 9, wherein the consumer is connected in parallel with the battery.

13. The device according to claim 7, further comprising an inverter adapted to convert a direct voltage into an alternating voltage for feeding the input of the rectifier.

14. The device according to claim 13, wherein a transformer for changing the level of the voltage from the inverter to the consumer and the battery is arranged between the inverter and the battery and the consumer.

15. The device according to claim 13, wherein the arrangement is adapted to control the inverter for controlling the output voltage on the output of the rectifier.

16. The device according to claim 7, wherein the arrangement is adapted to control the rectifier for controlling the output voltage on the output of the rectifier.

17. A method for regulating charging current to a battery, the method comprising:

measuring charging current supplied to the battery;

comparing the measured charging current with a current limit value; and reducing the charging current to the battery if the measured charging current exceeds the current limit value, wherein the current limit value is set higher than the measured charging current by a predetermined amount, except that the current limit value is subject to a maximum rise speed when the measured charging current rises faster than the maximum rise speed, and the current limit value is subject to a predetermined maximum current limit.

18. The method according to claim 17, wherein subjecting the current limit value to the maximum rise speed comprises:

receiving a first measurement of the measured charging current;

incrementing the first measurement by a predetermined amount;

receiving a second measurement of the measured charging current; and selecting the lowest of the incremented first measurement and the second measurement as the current limit value.

19. The method according to claim 17, wherein the a rectifier supplies the charging current to the battery, the rectifier being connected with its input to an alternating current source adapted to provide at least one consumer other than the battery with electric energy and being connected with its output to the battery.

20. The method according to claim 18, wherein the a rectifier supplies the charging current to the battery, the rectifier being connected with its input to an alternating current source adapted to provide at least one consumer other than the battery with electric energy and being connected with its output to the battery.

* * * * *